(12) United States Patent
White

(10) Patent No.: US 8,645,801 B2
(45) Date of Patent: Feb. 4, 2014

(54) DELIVERY METHOD FOR INTERNET PROTOCOL TELEVISION (IPTV)

(75) Inventor: Christopher A. White, Neshanic Station, NJ (US)

(73) Assignee: Alcatel Lucent, Paris (FR)

( * ) Notice: Subject to any disclaimer, the term of this patent is extended or adjusted under 35 U.S.C. 154(b) by 1025 days.

(21) Appl. No.: 12/195,559

(22) Filed: Aug. 21, 2008

(65) Prior Publication Data

US 2010/0050042 A1    Feb. 25, 2010

(51) Int. Cl.
*G06F 11/00* (2006.01)

(52) U.S. Cl.
USPC ............ 714/774; 714/752; 714/748; 714/758

(58) Field of Classification Search
USPC .................. 714/752, 799, 748, 774, 751, 746
See application file for complete search history.

(56) References Cited

U.S. PATENT DOCUMENTS

| | | | |
|---|---|---|---|
| 2006/0133355 A1 | 6/2006 | Anschutz | |
| 2007/0180465 A1* | 8/2007 | Ou et al. | 725/34 |
| 2007/0204196 A1 | 8/2007 | Watson | |
| 2007/0283392 A1* | 12/2007 | Tsusaka et al. | 725/47 |
| 2008/0005776 A1* | 1/2008 | VerSteeg et al. | 725/139 |
| 2008/0028276 A1* | 1/2008 | Li et al. | 714/752 |
| 2008/0134055 A1* | 6/2008 | Satchell | 715/757 |
| 2008/0141094 A1* | 6/2008 | Vayanos et al. | 714/751 |
| 2008/0288991 A1* | 11/2008 | Smoyer et al. | 725/95 |
| 2009/0067551 A1 | 3/2009 | Chen | |
| 2009/0282312 A1 | 11/2009 | Liu | |

FOREIGN PATENT DOCUMENTS

| | | |
|---|---|---|
| EP | 1931082 A1 | 6/2008 |
| WO | WO2008083627 | 7/2008 |
| WO | WO2008006012 | 10/2008 |
| WO | WO2008134897 | 11/2008 |

OTHER PUBLICATIONS

"Enablement of current terminal devices for the support of IPTV services; J.702 (10/08)"; ITU-T Standard, International Telecommunication Union, Geneva; No. J.702 (10/08) Oct. 29, 2008.
"Quality of experience requirements for IPTV services; G.1080 (12/08)" ITU-T Standard, International Telecommunication Union, Geneva; No. G.1080 (12/08) Dec. 7, 2008.
Degrande N et al; "Increasing the User perceived quality for IPTV services"; IEEE Communications Magazine, IEEE Service Center, Piscataway, US vol. 46, No. 2, Feb. 1, 2008.
Eunyong Park et al; "Efficient Multicast Video Streaming for IPTV Servcie over Wlan using CC-FEC" Internet Computing in Science and Engineering, 2008, ICICSE '08; International Conference on, IEEE, Piscataway, NJ USA Jan. 28, 2008; pp. 215-222.

* cited by examiner

*Primary Examiner* — Sarai Butler
(74) *Attorney, Agent, or Firm* — Brosemer, Kolefas & Associates

(57) ABSTRACT

A delivery method for IPTV which combines forward error correction (FEC) with retransmission techniques for handling packet loss and/or corruption. Packet loss or corruption of popular channels is handled through the use of FEC while packet loss of less popular channels is handled by retransmission.

6 Claims, 4 Drawing Sheets

DELIVERY METHOD FOR INTERNET PROTOCOL TELEVISION (IPTV)

FIELD OF THE INVENTION

This invention relates generally to the field of telecommunications and in particular to a method for the retransmission and/or forward error correction of television transmissions over internet protocol networks.

BACKGROUND OF THE INVENTION

Internet Protocol Television (IPTV) is a system in which digital television services are delivered using Internet Protocol (IP) over a network infrastructure which may advantageously include delivery by a broadband connection. More generally, IPTV is content which—instead of being delivered by traditional broadcast and cable formats, is delivered and received by a viewer through technologies traditionally employed by computer networks. Because IPTV requires real-time data transmission and uses the Internet Protocol, it is sensitive to packet loss and delays.

SUMMARY OF THE INVENTION

An advance is made in the art according to an aspect of the present invention directed to a delivery method for IPTV which combines forward error correction (FEC) with retransmission techniques for handling packet loss. The particular technique employed at a given time—forward error correction or retransmission—is dependent upon the particular content being delivered. Packet loss of popular channels is handled through the use of FEC while packet loss of less popular channels is handled by retransmission.

Advantageously the inventive method works with both unicast and/or multicast and retransmission and FEC may be used for either delivery method depending upon the particular network structure, expected error rate and reliability needs of the IPTV transmission.

According to an aspect of the present invention already noted, since packet loss on popular channels is handled through the use of FEC, any additional overhead imposed is substantially compensated by the absence of unicast retransmissions. More particularly, since each FEC packet may correct packet loss experienced by a plurality of users (which is indicative of popularity), the present invention exhibits a fixed overhead for popular channels which is independent of the number of users. Conversely—and a particular advantage of the present invention—is that the number of errors to correct does scale with the number of users (popularity).

According to another aspect of the present invention, packet loss on less popular channels is handled by retransmission. Advantageously, since there are fewer users of less popular channels at a given time, the overhead due to the retransmission may be smaller than any overhead associated with using FEC schemes for similarly unpopular channels. Stated alternatively, the retransmission overhead for less popular channels scales with the relatively small number of users associated with any unpopular channels.

BRIEF DESCRIPTION OF THE DRAWING

A more complete understanding of the present invention may be realized by reference to the accompanying drawings in which.

DETAILED DESCRIPTION

The following merely illustrates the principles of the invention. It will thus be appreciated that those skilled in the art will be able to devise various arrangements which, although not explicitly described or shown herein, embody the principles of the invention and are included within its spirit and scope.

Furthermore, all examples and conditional language recited herein are principally intended expressly to be only for pedagogical purposes to aid the reader in understanding the principles of the invention and the concepts contributed by the inventor(s) to furthering the art, and are to be construed as being without limitation to such specifically recited examples and conditions.

Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the diagrams herein represent conceptual views of illustrative structures embodying the principles of the invention.

Figure 1:
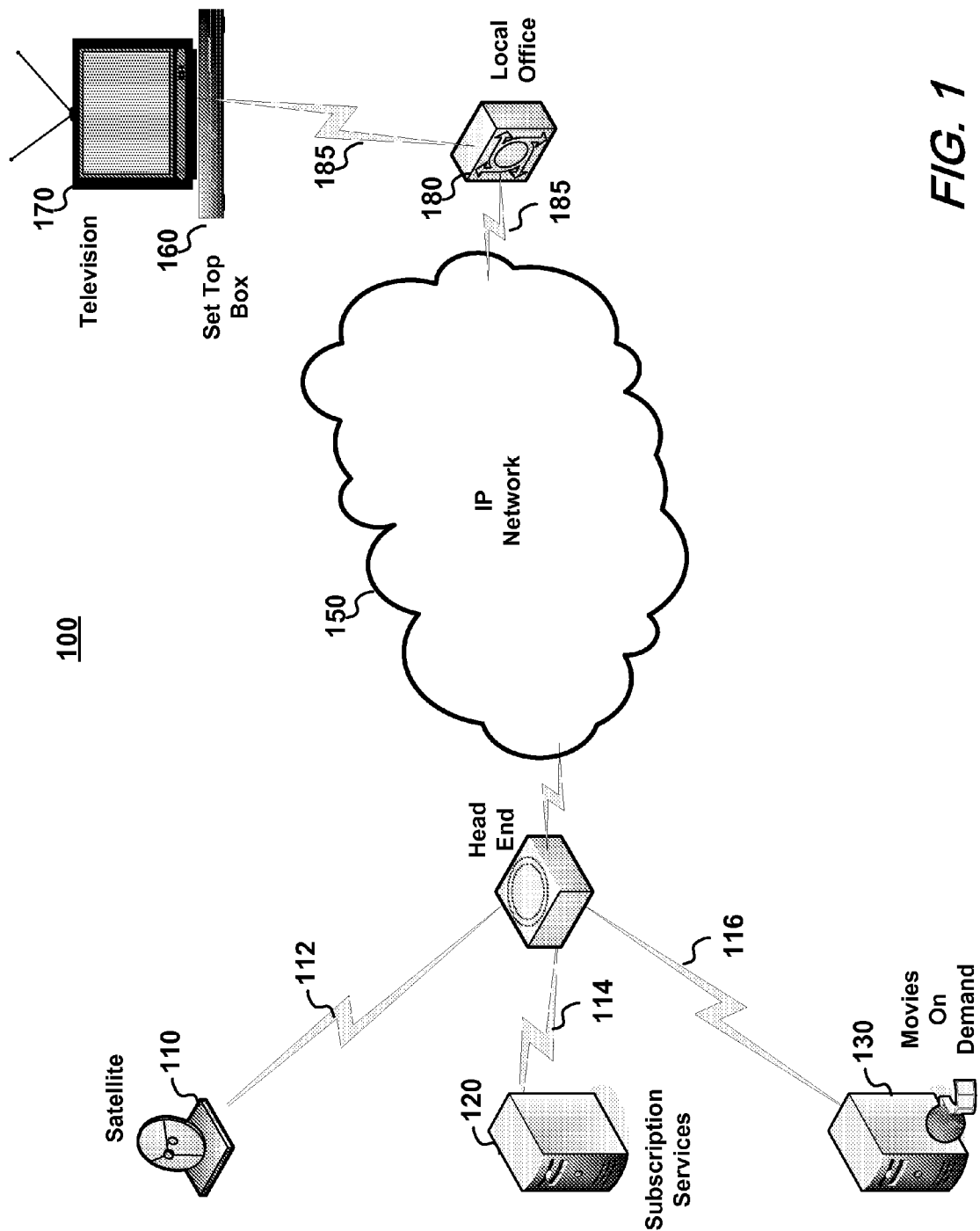
FIG. 1 is a schematic diagram of an Internet Protocol Television (IPTV) delivery network.

Turning now to FIG. 1 there is shown a schematic of a representative IPTV system. As shown in this FIG. 1, video content signals (network feeds) enter the system 100 and are pulled from a variety of sources including e.g., satellites 110, subscription services 120 and/or movies on demand 130. These signals enter via a headend 140, which may be national in scope. While not specifically shown, these signals are encoded (if necessary) by any of a variety of schemes (e.g., MPEG, H.264, WINDOWS Media, etc).

The signals are then "packetized" into IP packets and transmitted out into—for example—a telco's core network 150 which may be a large IP network that handles a variety of other traffic (data, voice, etc) in addition to video. Where a single telco or cooperating telcos control the IP network 150, quality of service QoS tools may prioritize the video traffic to mitigate delay or fragmentation of the signals. Absent such single control or cooperation, QoS requests may not be recognized and therefore delay and fragmentation problems may be compounded. Of course, those skilled in the art will readily recognize that even when controlled by a single entity, QoS is not a guarantee, and one always needs to account for the inevitable packet losses.

In a general implementation, the IP packets are received by a telecommunications company (TELCO) local office 180 and then further distributed via local loop 185 which may comprise DSL, optical fiber or other distribution technologies known in the art and subsequently received by, for example, a set top box (STB) and displayed on subscriber television 170.

While not specifically shown in this FIG. 1, those skilled in the art will appreciate that one job of the local office 180 is to receive video streams comprising the IP packets and then distribute them to subscribers. Generally, it is at the local office 180 that local content (such as TV stations, advertising, video on demand) is added to the transmission mix and where additional IPTV "middleware" is located. This middleware software stack may provide, for example, user authentication, channel change requests, billing, video-on-demand requests, etc.

In a representative environment such as that shown in FIG. 1, channels are multicast from the headend 140 to a plurality of local offices 180 at the same time. To engineer around the obvious bottleneck which may occur at a local office such as 180, subscribers need not be sent all of the possible channels (as is the case with contemporary cable TV systems). Instead, only a few channels may need to be sent from the local office 180 to its associated subscribers.

Accordingly, the set top box 160 does not "tune" to a channel as would—for example—a cable TV set top box. Instead, when a subscriber changes a channel on their set top box, the box effects the channel change by using—for example—an IP Group Membership Protocol (IGMP) request to join a new multicast group. When a local office 180 receives this request, it checks to make sure that a user is authorized to view the new channel. If so authorized, routers—for example—may then be directed to add that authorized user to the channel's distribution list. In this manner, only channel signals that are currently being watched are actually sent from the local office 180 to users.

Figure 2:
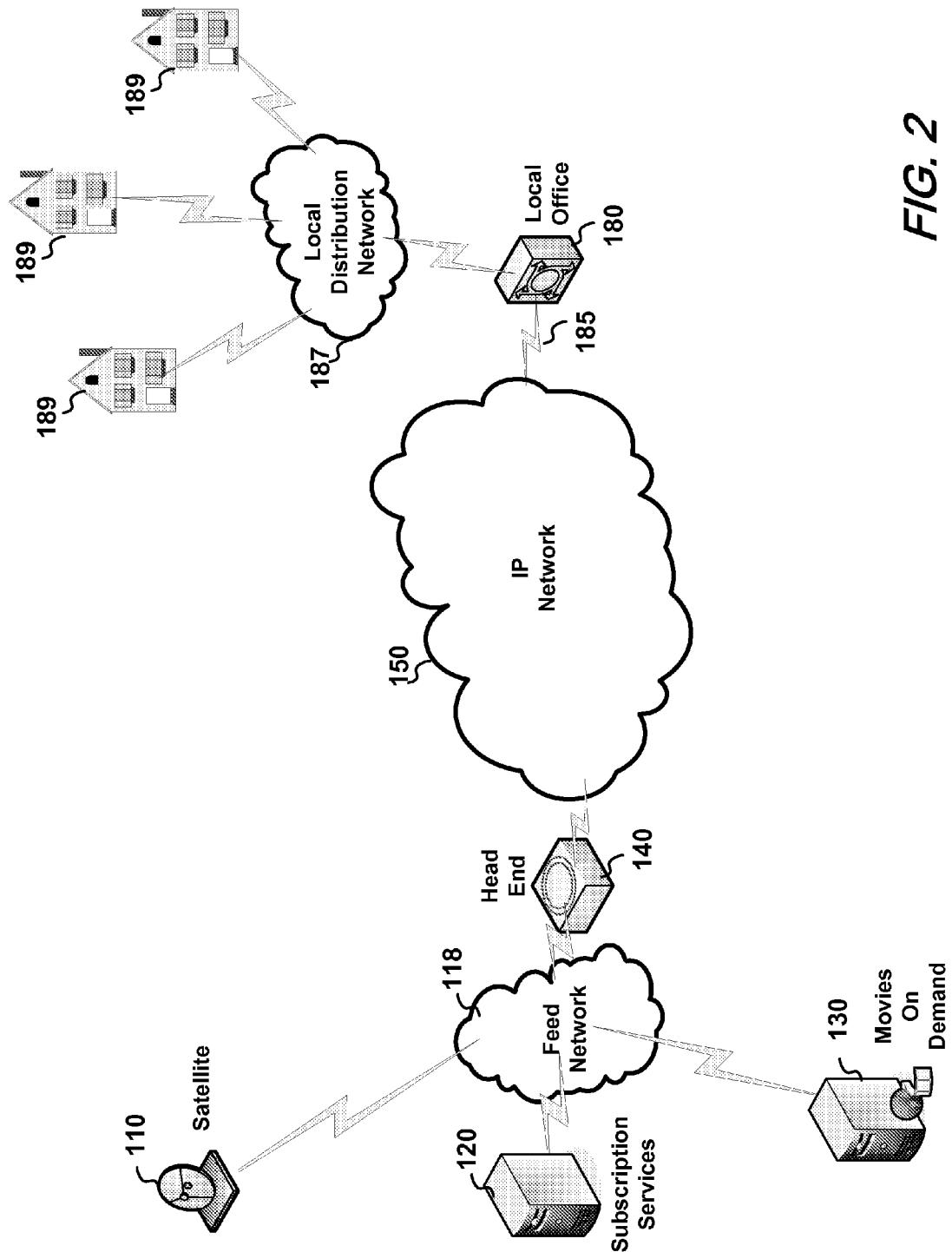
FIG. 2 is a schematic diagram of an alternate IPTV delivery network.

At this point it is notable that the simple point-to-point links 110, 112, 116 between feeds and the headend 140 as well as the simple point-to-point link 185 between the local office(s) 180 and set top boxes 160, may be replaced by any of a variety of known communications technologies as depicted by feed network 118 and local distribution network 187. In this manner—and as shown in FIG. 2.—the headend 140 receives a variety of programming, which is packetized using IP protocols and distributed via IP Network 150 to one or more local offices 180, which—in turn—distributes appropriate content to one or more recipients 189 via local distribution network 187.

As already noted, even well engineered networks employing QoS controls are susceptible to errors in video streams. Typically for unicast streams, a set top box may request that any lost or corrupt packets are resent (retransmission). With multicast streams however, a variety of error correction methods including forward error correction (FEC) have been used.

It should be noted that while it is possible to use a retransmission methodology with multicast streams however, the retransmission is sent as an additional unicast stream. Advantageously, one of many benefits of the present invention is the reduction of retransmission overhead.

Forward error correction is a reliability method which provides the ability to overcome both losses and corruption. Generally speaking, redundant bits (or packets) are added to an outgoing video stream such that a receiver may be able to detect and correct errors. As a result, retransmissions are reduced. Of course, one detriment of FEC is that even when a transmission is good, bandwidth is "wasted" by including the overhead necessary to detect and correct errors. In contrast, retransmission only occurs when there are errors in the transmission.

Ideally, FEC in the context of IP multicast is used to generate encoding symbols that are transmitted in packets in such a way that each received packet is fully useful to the receiver in that the receiver may reassemble an object regardless of previous packet reception patterns. Therefore, if packets are lost in transit between a sender and a receiver, instead of requesting retransmission of the lost packets the receiver may use other packets that arrive to reassemble the object.

Note that different categories of FEC are defined based upon the number of errors (packet losses) which can be recovered. Notwithstanding this however, if too many packets are lost during a transmission, the FEC method will fail to recover the lost data resulting in video distortions. Generally, the more lost packets that a particular FEC method can compensate for, the greater the overhead necessary.

According to an aspect of the present invention, a mix of retransmission and forward error correction is employed to ensure a reliable viewing experience for a viewer.

More particularly, forward error correction is applied to channels which are sufficiently popular to warrant its overhead. Channels which are less popular—use retransmission. As already noted, the particular method (FEC or Retransmission) is determined by channel popularity and not by the particular transmission method, i.e., multicast vs. unicast or the details of the network structure and implementation.

Figure 3:
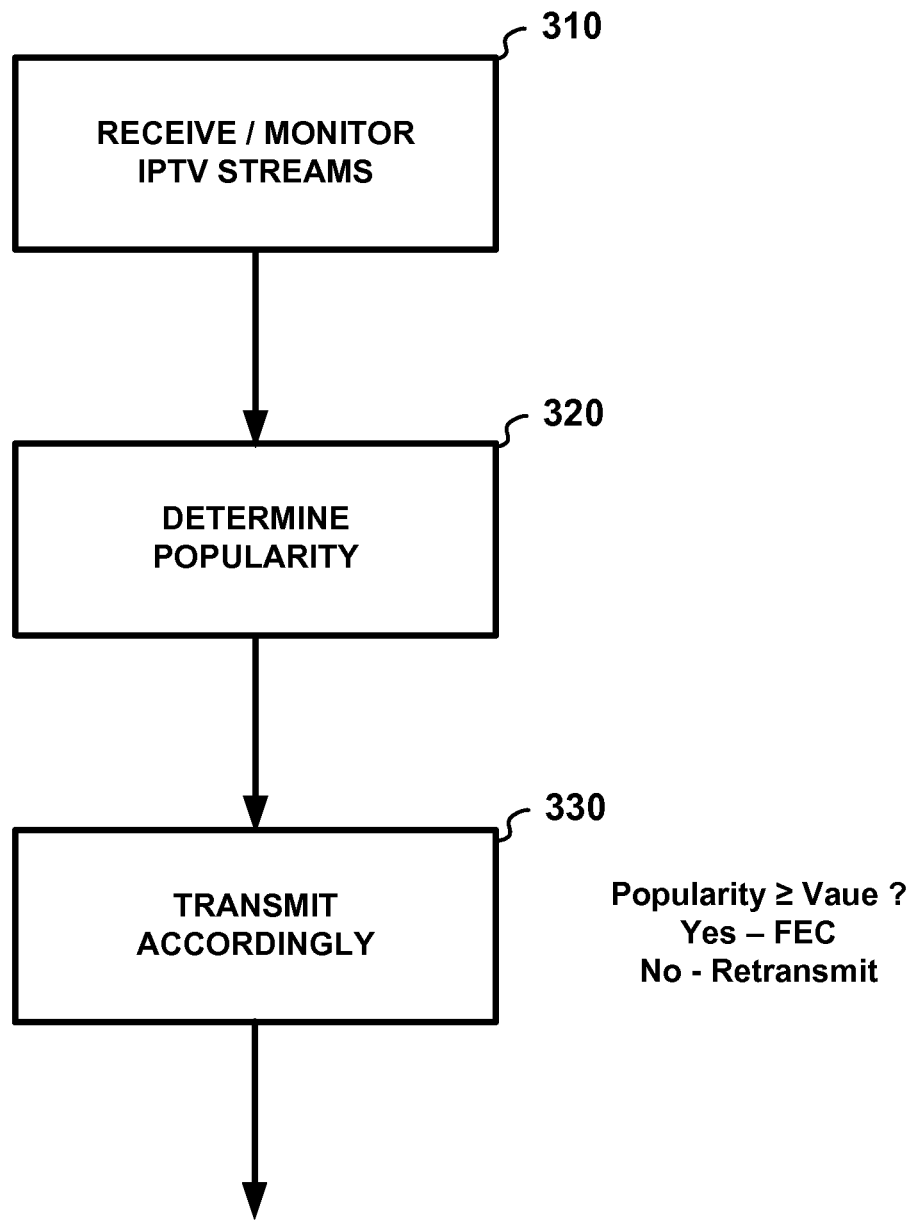
FIG. 3 is a flowchart depicting a method according to an aspect of the present invention.

Turning now to FIG. 3, there is shown a flowchart depicting a method for IPTV transmission according to an aspect of the present invention. In particular, at a point in the transmission path(s) described previously, one or more IPTV streams are received 310 and their popularity is determined 320. When that popularity exceeds a predetermined threshold, then FEC is used for transmission else retransmission protocols are employed 330.

It is noted that the point in the distribution where this method occurs is variable. In some environments it may advantageously take place in the headend, while in others it may take place at the local level, e.g., the local office. Furthermore, the determination need not be static as shown in this FIG. 3.

Figure 4:
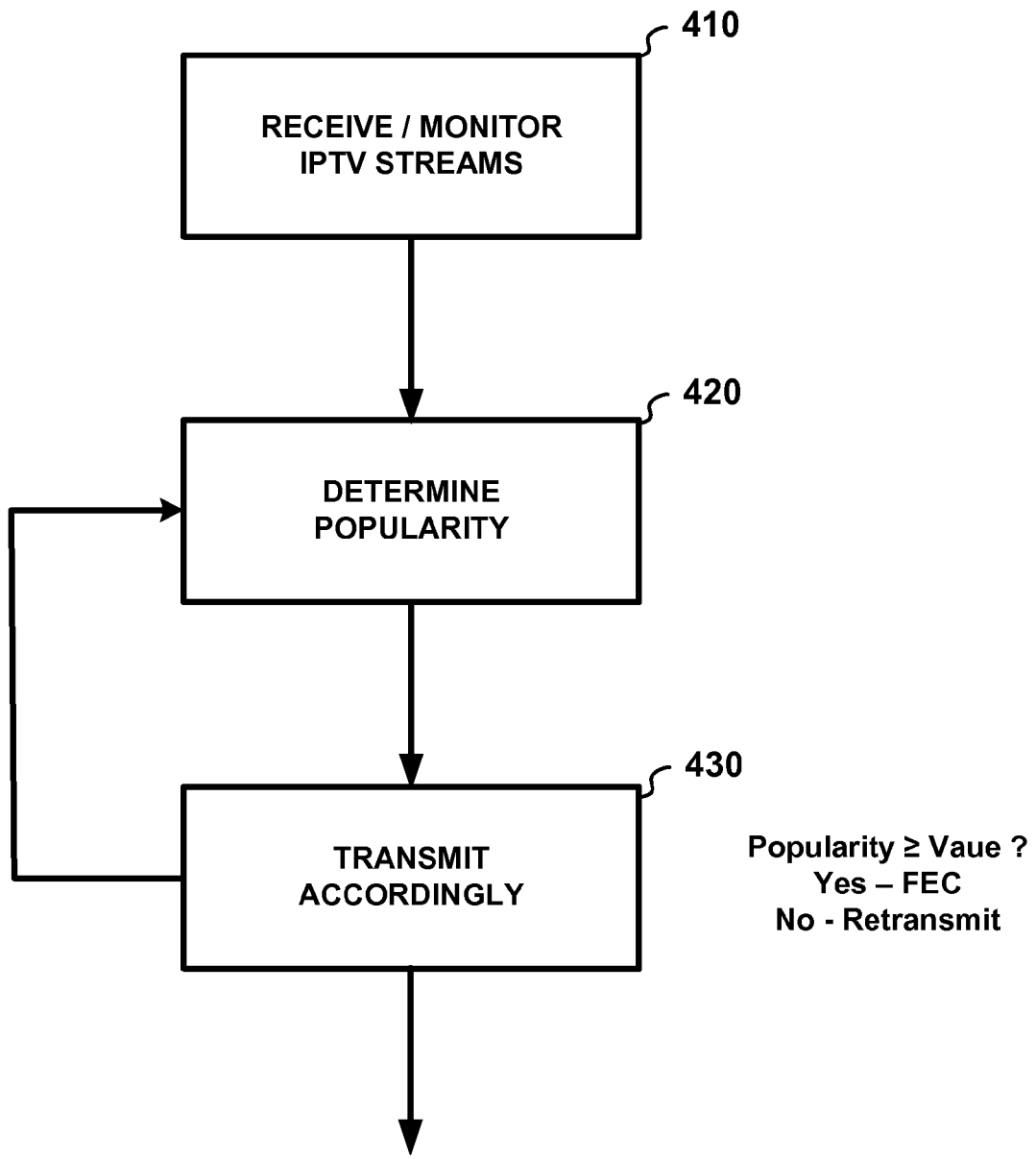
FIG. 4 is a flowchart depicting an alternative method according to an aspect of the invention.

More particularly, and with reference now to FIG. 4, there it shows a method according to another aspect of the present invention in which the popularity determination varies with time. In particular, received IPTV streams 410, are continually evaluated for popularity 420 and transmitted accordingly 430. Consequently, the popularity and hence transmission method employed may vary for a single channel/program as its popularity changes with a particular broadcast.

One method for determining the popularity of a particular IPTV stream may—for example—be the number of recipients for a multicast stream. Alternatively, the "popularity" may be determined by the number of retransmission requests over a given period of time. In this scenario—and for the purposes of simple example—if a sufficiently large number of recipients requested retransmissions in a sufficiently short period of time, this may be indicative of network difficulties. In this situation, the broadcast may be changed from retransmission method(s) to FEC methods even though the number of viewers did not change.

Note that it is possible to predict the popularity apriori. For example, one may predict the popularity of a weekly series. This would allow—for example—the pre-computation of the FEC packets which advantageously may reduce computational overhead.

Additionally, it is notable that a channel may be popular in one segment of the network and not popular in another. Consequently, such a channel may advantageously be distributed using FEC in a segment of the network and not in another. By way of example, a football game broadcast may be more popular in one region but not in another as a result of—for example—the time played or teams playing.

Since FEC methods consume a portion of the available broadcast bandwidth, periodic attempts at retransmission methods may indicate that the network difficulties which precipitated the change are cured and that the retransmission method is now sufficiently reliable for use.

At this point, while we have discussed and described the invention using some specific examples, those skilled in the art will recognize that my teachings are not so limited. For example, additional motivation for switching between FEC and retransmission methods may be employed. Additionally, it is explicitly recognized that popularity may be locally determined—as particular programs may be more popular in a particular geographic region or time zone. Also, particular types of program—for example—reruns—may have historical data indicative of their popularity or may be of such current public interest that their popularity may be anticipated and therefore determined apriori. Finally, certain other types of programs may be of such a type (i.e., historical, sports, news, etc) that their popularity may be anticipated and therefore determined before broadcast. Accordingly, the invention should be only limited by the scope of the claims attached hereto.

I claim:

1. A method for delivering Internet Protocol Television (IPTV) streams comprising the steps of:
   determining the popularity of a program conveyed by a particular stream;
   delivering the stream using forward error correction protocols when the popularity of the program exceeds a predetermined threshold, else delivering the stream using retransmission protocols;
   wherein the popularity of the program is determined from the number of subscribers simultaneously viewing the program; and a delivery method used for the stream is chosen independent of the error correction protocol employed; and
   wherein the popularity of the program being delivered via an IPTV delivery network exhibits a different, locally determined popularity characteristic with respect to different network segments such that the program is simultaneously delivered using forward error correction protocols over a segment of the network and retransmission protocols over a different segment of that same network.

2. The method of claim 1 wherein the popularity of the program is determined prior to its conveyance.

3. The method of claim 2 wherein the popularity of the program is further determined from historical data.

4. The method of claim 3 wherein the historical data includes whether or not the program is a rerun.

5. The method of claim 2 wherein the popularity of the program is further determined from a general type of programming of which the program is representative.

6. The method of claim 1 wherein the delivery method for the stream is one selected from the group consisting of: multicast and unicast.

* * * * *